(12) United States Patent
Fife

(10) Patent No.: US 6,517,645 B2
(45) Date of Patent: *Feb. 11, 2003

(54) VALVE METAL COMPOSITIONS AND METHOD

(75) Inventor: James A. Fife, Myrtle Beach, SC (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,440

(22) Filed: Mar. 21, 2001

(65) Prior Publication Data

US 2001/0030005 A1 Oct. 18, 2001

Related U.S. Application Data

(60) Division of application No. 09/426,020, filed on Oct. 25, 1999, now Pat. No. 6,231,689, which is a continuation of application No. PCT/US98/08170, filed on Apr. 23, 1998, which is a continuation-in-part of application No. 08/845,736, filed on Apr. 26, 1997, now Pat. No. 6,051,326.

(51) Int. Cl.$^7$ ............................................... C22C 27/02
(52) U.S. Cl. ..................... 148/422; 148/902; 428/610; 428/662
(58) Field of Search ................................ 148/422, 902; 420/427; 428/662, 610

(56) References Cited

U.S. PATENT DOCUMENTS

| | | | |
|---|---|---|---|
| 3,265,540 A | 8/1966 | Foley ........................ 148/668 |
| 3,497,402 A | 2/1970 | Douglass et al. ............ 148/668 |
| 3,647,420 A | 3/1972 | Restelli ........................ 75/84 |
| 3,850,701 A | 11/1974 | Itai et al. .................. 428/472.2 |
| 4,062,679 A | 12/1977 | Marsh et al. .................. 75/245 |
| 4,067,735 A | 1/1978 | Bezruk et al. ................. 75/211 |
| 4,097,347 A | 6/1978 | Packer ....................... 204/109 |
| 4,235,629 A | 11/1980 | Marsh et al. ................. 420/427 |
| 4,483,819 A | 11/1984 | Albrecht et al. ................ 419/2 |
| 4,574,333 A | 3/1986 | Snyder ........................ 361/433 |
| 4,646,197 A | 2/1987 | Wong ......................... 361/307 |
| 4,722,756 A | 2/1988 | Hard ......................... 148/126.1 |
| 4,859,257 A | 8/1989 | Bates et al. ................. 148/422 |
| 4,960,471 A | 10/1990 | Fife et al. .................. 148/20.3 |
| 5,100,486 A | 3/1992 | Krikorian et al. ........... 148/248 |
| 5,242,481 A | 9/1993 | Kumar ........................ 75/364 |
| 5,605,561 A | 2/1997 | Iwabuchi et al. ............. 75/364 |
| 5,868,913 A | 2/1999 | Hodgson ............... 204/298.01 |
| 6,051,326 A * | 4/2000 | Fife ........................... 428/610 |

FOREIGN PATENT DOCUMENTS

| | | | |
|---|---|---|---|
| DE | 3227726 A1 | 3/1983 | |
| EP | 966589 | 8/1961 | |
| EP | 1011715 | 12/1965 | |
| EP | 0 468 130 A1 | 1/1991 | |
| GB | 1 030 004 | 5/1966 | |
| GB | 2 147 611 A | 5/1985 | ............. B22F/1/00 |
| JP | 36-8405 | 6/1961 | |

OTHER PUBLICATIONS

Metals Division, National Research Corporation, Data Sheet, "Stable Grain Size Tantalum", 1964.
International Search Report for PCT/US98/08170.

* cited by examiner

*Primary Examiner*—Roy King
*Assistant Examiner*—Harry D. Wilkins, III

(57) ABSTRACT

Valve metal articles such as wire, sheet or powder having a second metal, preferably in a peripheral margin, prepared by coating the valve metal with a salt solution of the metal additive and heat treating in the presence of an oxygen getter to remove the oxygen from the valve metal and the anion of the metal salt to form the metal additive. For tantalum wire a preferred second metal is nickel. A preferred oxygen getter is magnesium. Nickel-containing tantalum wire is useful for enhance bonding to sintered pressed tantalum powder pellets in the production of electrolytic capacitors.

51 Claims, No Drawings

VALVE METAL COMPOSITIONS AND METHOD

This application is a divisional of U.S. patent application Ser. No. 09/426,020, filed Oct. 25, 1999, now U.S. Pat. No. 6,231,689, which is a continuation of International Application No. PCT/US98/08170, filed Apr. 23, 1998, which is a continuation-in-part of U.S. application Ser. No. 08/845,736, filed Apr. 26, 1997, now U.S. Pat. No. 6,051,326.

BACKGROUND OF THE INVENTION

Valve metals such as tantalum and niobium are characterized by a stable oxide coating which imparts useful properties such as corrosion resistance and electrical resistance which make such metals attractive for various applications such as an anode material in electrolytic capacitors and as a material of construction in certain corrosive environments. The oxide coating can be a hindrance in bonding valve metals, e.g. in sintering pressed valve metal powders into a pellet bonded to a valve metal lead wire or lead tab. As finer valve metal powders are used to achieve higher capacitance, lower sintering temperatures are used to prevent excessive loss of surface area from exposure to sintering temperatures. Moreover, as satisfactory particle to particle bonding is achieved in the pressed powder, the particle to lead connection bond can be deficient at lower sintering temperatures allowing the sintered pellet to be readily pulled off of the lead wire or lead tab during fabrication or use of the capacitor.

SUMMARY OF THE INVENTION

This invention provides valve metal including a second metal where the second metal is preferably at a greater concentration at or near the peripheral portion of the valve metal than within the valve metal. Such valve metal may be in a variety of forms, e.g. wire, sheet including foil, or particulate including flaked, nodular or angular powder. In such forms, the second metal is concentrated in the valve metal at the periphery of the valve metal form or valve metal article. Valve metal wire according to this invention is useful in the fabrication of anodes for electrolytic capacitors to provide enhanced bonding strength between such wire and sintered pellets of valve metal powder. Valve metal sheet according to this invention is similarly useful to form lead tabs on sintered valve metal powder anodes.

This invention also provides a method of adding a second metal to valve metal comprising:

(a) coating a valve metal surface with a solution comprising a second metal; and (b) heating said valve metal and coating in the presence of an oxygen getter at a temperature sufficient to remove oxygen from said valve metal and to provide said valve metal with said second metal in a peripheral region of said valve metal. Preferably, the second metal is provided at or near to the surface of the valve metal, e.g. in a peripheral region, to improve a surface property of the valve metal.

DETAILED DESCRIPTION OF PREFERRED EMBODIMENTS

As used herein the term "valve metal" refers to tantalum, niobium, alloys of valve metals including alloys of tantalum and niobium, and valve metals including grain growth inhibitors such as tantalum with up to about 1000 ppm of silicon or yttrium oxide, niobium with zirconium and the like. Unlike the second metal which is preferably concentrated at a peripheral region, other additives to a valve metal such as grain growth inhibitors and alloying elements are more uniformly distributed throughout the valve metal.

As used herein the term "second metal" refers to a metal component in a valve metal which is not uniformly distributed throughout the valve metal. Useful second metals can be found in Groups IVB, VB, VIB, VIIB, and VIII of the periodic table and include tantalum, niobium, nickel, titanium, zirconium, tungsten and iron. Nickel is a preferred second metal for tantalum articles to be bonded to sintered tantalum powders.

In the method of this invention a second metal is added to a valve metal by coating the valve metal surface with a compound of the second metal and heating the coated valve metal in the presence of an oxygen getter at a temperature sufficient to remove oxygen from said valve metal and provide the metal in the peripheral region of the valve metal. The getter should also be effective in removing anions associated with the second metal in the coating. This method is especially useful in preparing valve metal wire, powder and sheet with a second metal.

When such second metal-containing wire is used as lead wire for preparing sintered anodes of pelletized valve metal powder, higher bond strength between the sintered powder and lead wire can be achieved. Such wire is expected to be useful with valve metal powder which is preferably sintered at low temperatures, e.g. less than 1500° C. for tantalum powders or lower such as in the range of 1200 to 1400° C.

It is expected that the improved bonding of an anode pellet to an anode lead wire in accordance with the present invention will reduce (and thereby improve) the susceptibility of the anode to inrush surge current. While not wishing to be bound by theory, it is understood that inrush surge current, as occurs when a discharged circuit is initially energized, can cause disruption of tantalum capacitors if the contacts between powder and wire are poorly established and therefore of small total cross-section area. The high instantaneous current forced to traverse poorly developed bonds results in high current density and ohmic heating in the area of the wire-anode interface. The high current density and heat generation can result in capacitor failure and possibly even ignition of the valve metal pellet. The improved wire to pellet bonding provided by this invention is expected to reduce the occurrence of disruptions caused by current surge.

Valve metal sheet according to this invention is also expected to be useful in making lead tabs for sintered anodes of high capacitance valve metal powder. Thus, preferred articles of this invention are valve metal wires and sheets having a second metal which improves a surface property, e.g. bonding to sintered bodies of valve metal powder. Such lead wires commonly have diameters in the range of about 100 to 1000 micrometers ($\mu$m); sheets may be thinner, e.g. on the order of 50 $\mu$m; and foil, even thinner. Second metal-containing powders according to this invention may be useful as bonding agents for joining valve metal parts or for low temperature sintering valve metal powders or simply providing metal additives, e.g. dopants, to valve metals in peripheral regions.

Preferred wire and sheet provided by this invention have a second metal concentrated in the peripheral region of the valve metal article where the thickness of the peripheral region will depend on the diffusion rate of the second metal into the valve metal. Factors influencing diffusion are expected to include the concentration per unit surface area of the second metal in the coating and the time and temperature at which the valve metal is subjected to thermal treatment as with exposure to the oxygen getter. In many cases it is preferable that the peripheral region in which the second metal is concentrated be as thin as possible to provide enhanced surface properties without affecting bulk properties of the valve metal. Another benefit of a thin peripheral region of concentrated second metal is that the second metal concentration can be reduced to minimal levels after the enhanced surface properties have been utilized, e.g. by thermal treatment to facilitate diffusion of the second metal into the bulk of the valve metal which has a low concentration, if any, of the second metal, e.g. into the core region of a wire or center region of a sheet. In preferred aspects of this invention the peripheral region of concentrated second metal can be within 1 to 2 micrometers from the surface. For some applications the second metal concentration in the peripheral region can be up to about 1 weight percent or more. Based on the total weight of valve metal in an article, the bulk concentration of the second metal can be in the range of 2 to 2000 ppm. For some applications bulk concentration of the second metal can be 5 to 200 ppm. For other application the bulk concentration of the second metal can be 5 to 50 ppm.

A valve metal wire in accordance with the invention can be annealed (55,000–90,000 psi), unannealed—half hard (105,000–160,000), or unannealed—hard (130,000–215,000 psi).

A useful second metal for tantalum is nickel which is stable and resistant to corrosion. The amount of nickel used in tantalum wire will preferably be the minimal amount that will provide enhanced properties, i.e. enhanced bonding to sintered valve metal powder with minimal adverse effect on electrical properties of finished anodes. An advantage of this invention is that during thermal sintering the concentration of the second metal, e.g. nickel, will initially be higher in the peripheral region to facilitate bonding of powders to the wire; and, as sintering continues the second metal will tend to diffuse away from the surface into the center of the wire to provide a low concentration at the peripheral region so as to not adversely affect electrical properties of an electrolytic capacitor.

In the method of this invention uniform coating of the second metal is preferably provided by using a solution comprising a soluble salt of the second metal. Such a solution can be coated onto the oxygen passivated surface of valve metal. The metal solution can be applied in an organic or aqueous solution. Useful anions for such soluble salts of such second metal include chloride, sulfate, carbonate and nitrate. Useful organic solvents include acetone, xylene, metanol, acetonitrile, methylene chloride, N-pyrrolidone, dimethylsulfoxide, dimethylacetamide, dimethylformamide, methyl ethyl ketone, glycol ethyl ether and the like. To assist in forming and maintaining a uniform coating on the surface the solution can preferably also include adjuvants such as binders, thickeners, leveling agents, surfactants and the like as are commonly employed in coatings. Useful adjuvant binders include polypropylene carbonate, hydroxypropyl methylcellulose, polyvinylalcohol, polyvinylbutyral and polymeric latex; a preferred adjuvant binder is polypropylene carbonate. The concentration of the second metal and adjuvant will depend on the thickness of a uniform coating that can be applied and the desired second metal concentration. Such solutions can be applied to the valve metal by any known method, e.g. dipping etc. A useful application for wire coating includes drawing wire through a porous medium saturated with the solution or through a bath of the solution. The coating is fixed by evaporating the solution and/or setting, e.g. gelling or crosslinking, a binder adjuvant. A useful way for fixing the coating on a wire is to draw the coated wire through a convection heating zone to assist in solvent removal. A useful convection heating zone can be a vertical or horizontal tubular chamber with a heated gas flow concurrent or countercurrent to the motion of the wire in the chamber.

In the method of this invention, after the second metal compound coating is fixed, the valve metal article is heated in the presence of an oxygen getter at a temperature sufficient to remove the oxide coating from the valve metal and to provide reduced second metal in the valve metal. Useful oxygen getters are materials having a greater affinity for oxygen than the valve metal. Such oxygen getters include magnesium, calcium, sodium, aluminum, carbon, titanium and zirconium. The getter must also have a higher affinity for oxygen than the second metal, e.g. when the second metal is titanium or zirconium. The oxygen getter can also be effective in extracting the anion from the second metal salt. Magnesium is a preferred oxygen getter when nickel chloride is used to provide the second metal salt. When the article is wire, the wire can be loosely wound on a spool, e.g. a valve metal spool, to provide exposure to the spooled wire to a gas phase comprising the getter material. The article is preferably exposed to the getter material in a vacuum furnace which allows evacuation of atmospheric oxygen and a relatively high concentration of the oxygen getter in an inert gas phase, e.g. gas phase comprising argon and magnesium vapor. When magnesium is used as the oxygen getter, temperatures above 800° C. are useful for removing the surface oxygen from the valve metal. Procedures for removing oxygen from valve metals can be found in U.S. Pat. Nos. 3,647,420; 4,722,756; 4,960,471 and 5,241,481 all of which are incorporated herein by reference.

Valve metal wire prepared by this invention is typically softened by heat treatment with oxygen getter; the tensile strength of such softened wire is often unsatisfactory for use as lead wire in the manufacture of valve metal anodes for electrolytic capacitors. Heat treatment and quenching to harden the wire will generally be detrimental for use in capacitor applications due to oxygen pickup in such treatment. It has been discovered that the surface and peripheral region of second metal-containing valve metal wire of this invention is durable, unlike many surface coatings, and can tolerate wire drawing to a reduced diameter which effectively cold works the wire to provide sufficient strength for capacitor lead applications. In the case where the second metal salt coating was not uniformly applied, e.g. striated, and resulting in some peripheral region with a low concentration of the second metal, it may be useful to apply oxide coating to the wire prior to drawing to minimize galling from the drawing dies.

The above described process can also be modified to provide a second metal in valve metal powders, e.g. powders having dimensions on the order of 1 to 10 micrometers. For example, valve metal powder can be coated with second metal salt solution and dried e.g. in a fluid bed. Such metal salt-coated valve metal powder can be treated with an oxygen getter to form the second metal in the valve metal powder. Useful valve metal powders of this invention can include nickel-containing tantalum powder and niobium-containing tantalum powder and tantalum-containing niobium powder. A nickel-containing tantalum powder could be useful as a bonding agent for tantalum parts. Tantalum-containing niobium powder could provide enhanced electrical properties to niobium powders.

The following examples serve to illustrate certain aspects of this invention.

EXAMPLE 1

A 0.8 wt % nickel coating solution was prepared by dissolving 32.4 g of nickel chloride hexahydrate in 200 ml of methanol and slowly adding the nickel chloride/methanol solution to 800 ml of a 5 wt % solution of polypropylene carbonate in acetone which was prepared by adding acetone to a 20 wt % solution of QPAC-40-M polypropylene carbonate obtained from PAC Polymers, Allentown, Pa. A tantalum wire of about 710 μm in diameter was coated by passing the wire through a sponge saturated with the 8.0 wt % nickel solution and then passing the wire through a length of Inconel tubing with a co-current stream of warm air to assist in solvent evaporation. The wire with a dried coating was wound loosely on a tantalum spool and a quantity of magnesium powder were placed in a tantalum canister in a vacuum oven. The quantity of magnesium powder was sufficient to remove the surface oxygen from the tantalum (wire, spool and canister) and the chloride ions from the coating. Air was evacuated from the furnace and replaced with argon at low pressure (about 13 Pa). The temperature was raised to 925° C. for a period of 2 hours to allow vaporized magnesium to be in contact with the surface area of the coated wire. After the oven was cooled, air was introduced into the oven and the wire removed and washed in a mixed acid bath of about 20% nitric acid and 2% hydrofluoric acid to remove residual magnesium, magnesium oxide and magnesium chloride. The wire was softened by the thermal treatment and exhibited a tensile strength of 530 megaPascals (MPa) (77,000 psi). Bulk analysis of the wire showed overall nickel content to be 45 ppm. Although the wire did not have a nickel coating, that amount of nickel would be equivalent to a nickel surface coating of 319 Angstroms thick. SEM analysis of the surface of the wire to a depth of about 1.5 to 2 micrometers indicated the presence of nickel and tantalum. The wire was respooled and drawn to a diameter of 240 micrometers to provide a work hardened wire which had a tensile strength of 1190 MPa (173,000 psi). SEM analysis of the surface of the drawn wire also indicated the presence of nickel and tantalum. Surface mapping of the surface of the wire by X-ray analysis indicated uniform distribution of tantalum and nickel. A coiled segment of the treated drawn wire was anodized under conditions similar to that used to anodize sintered pellets of pressed tantalum powder in the manufacture of electrolytic capacitors. When an electric current was applied to the coiled segment of the drawn wire immersed in 0.13 weight percent (wt %) phosphoric acid, bubbles in the acid indicated short circuiting through the tantalum oxide on the surface of the wire preventing buildup of an oxide layer. Another coiled segment of the wire was heated to 1300° C. for 30 minutes to simulate sintering conditions for a pressed pellet of tantalum powder. The heat treated wire was anodized for 30 minutes in a 0.13 wt % phosphoric acid at 93° C. with constant current rising to a terminal voltage of 200 volts; terminal voltage was maintained for 5.5 minutes. Segments of anodized wire were immersed in 0.1% phosphoric acid at 25° C. with an applied 180 volts for 2 minutes; DC leakage for the anodized wire segments was in the range of 0.25 to 1 milliamps per square centimeter (about 1.5 to 7 milliamps per square inch). DC leakage for a reference tantalum wire (without the second metal) was about 0.04 milliamps per square centimeter.

EXAMPLE 2

Nickel-containing tantalum wire was prepared in the manner of Example 1 except that the nickel salt solution was applied by sponge to a vertically hanging wire. The wire was work hardened by drawing to a diameter of 250 micrometers and used as lead wires in sintered tantalum powder anodes for an electrolytic capacitor. Tantalum powder was pressed in a mold around the end of the wire and the wire with pressed tantalum powder was sintered at common manufacturing conditions. The quality of powder bonding to the lead wire was tested by pulling the wire from the sintered pellet. Lead wires containing nickel according to this invention wires were pulled from sintered pellets using 50 percent greater force than that required when a standard tantalum wire was used.

What is claimed is:

1. A valve metal including a second metal wherein the concentration of the second metal is greater at or near the surface of said valve metal wherein second metal is diffused in said valve metal.

2. A valve metal according to claim 1 wherein the ratio of the total amount of said second metal to the total amount of valve metal is between 5 to 2000 ppm.

3. An article comprising the valve metal of claim 1.

4. An article according to claim 3 wherein said valve metal comprises tantalum, niobium or an alloy thereof and the second metal is selected from the group consisting of tantalum, niobium, nickel, titanium, zirconium, tungsten and iron.

5. An article according to claim 4 wherein said second metal is alloyed with said valve metal.

6. The article of claim 3, wherein said article is a sheet.

7. An article according to claim 1 comprising wire, sheet or powder.

8. The valve metal of claim 1, wherein said second metal is within 1 to 2 micrometers from the surface of the valve metal.

9. An article comprising the valve metal of claim 8.

10. The valve metal of claim 1, wherein said second metal is present at a concentration of about 1 wt % or more.

11. An article comprising the valve metal of claim 10.

12. The valve metal of claim 1, wherein said second metal is present in a bulk concentration of from 2 to 2000 ppm.

13. An article comprising the valve metal of claim 12.

14. The valve metal of claim 1, wherein said valve metal is tantalum and said second metal is zirconium.

15. An article comprising the valve metal of claim 14.

16. The article of claim 15, wherein said article is a sheet.

17. The valve metal of claim 1, wherein said second metal is a Group IVB, VB, VIB, VIIB, or VIII metal.

18. An article comprising the valve metal of claim 17.

19. The article of claim 18, wherein said article is a sheet.

20. The valve metal of claim 1, wherein said second metal is at the surface of said valve metal.

21. An article comprising the valve metal of claim 20.

22. The article of claim 21, wherein said article is a sheet.

23. The valve metal of claim 20, wherein said second metal is within 1 to 2 micrometers from the surface of the valve metal.

24. An article comprising the valve metal of claim 23.

25. The valve metal of claim 20, wherein said second metal is present at a concentration of from about 1 wt % or more.

26. An article comprising the valve metal of claim 25.

27. The valve metal of claim 20, wherein said second metal is present in a bulk concentration of 2 to 2000 ppm.

28. An article comprising the valve metal of claim 27.

29. The valve metal of claim 20, wherein said valve metal is tantalum and said second metal is zirconium.

30. An article comprising the valve metal of claim 29.

31. The valve metal of claim 20, wherein said second metal is a Group IVB, VB, VIB, VIIB, or VIII metal.

32. An article comprising the valve metal of claim 31.

33. The valve metal of claim 1, wherein said valve metal is tantalum and said second metal is titanium.

34. An article comprising the valve metal of claim 33.

35. The valve metal of claim 1, wherein said valve metal is tantalum and said second metal is nickel.

36. An article comprising the valve metal of claim 33.

37. The valve metal of claim 1, wherein said valve metal is tantalum and said second metal is tungsten.

38. An article comprising the valve metal of claim 37.

39. The valve metal of claim 1, wherein said valve metal is tantalum and said second metal is iron.

40. An article comprising the valve metal of claim 39.

41. The valve metal of claim 1, wherein said valve metal is tantalum and said second metal is niobium.

42. An article comprising the valve metal of claim 41.

43. The valve metal of claim 1, wherein said valve metal is tantalum and said second metal is chromium.

44. An article comprising the valve metal of claim 43.

45. A hardened tantalum wire including nickel in the peripheral portion of said wire.

46. A wire according to claim 45 wherein a ratio of the amount of nickel to bulk amount of tantalum is at a ratio between 5 and 200 ppm.

47. A wire according to claim 46 wherein said ratio is between 5 and 50 ppm.

48. A hardened tantalum wire according to claim 45 having an ultimate tensile strength greater than 120,000 psi.

49. A tantalum wire according to claim 45 having a tensile strength from about 55,000 to about 90,000 psi.

50. A tantalum wire according to claim 45 having a tensile strength from about 105,000 to about 160,000 psi.

51. A tantalum wire according to claim 45 having a tensile strength from about 130,000 to about 215,000 psi.

* * * * *